(12) United States Patent
Takahashi

(10) Patent No.: US 8,302,645 B2
(45) Date of Patent: Nov. 6, 2012

(54) PNEUMATIC TIRE WITH TREAD HAVING MAIN GROOVES, OBLONG HOLES, AND COMMUNICATION GROOVES

(75) Inventor: Toshihiko Takahashi, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 301 days.

(21) Appl. No.: 12/743,588

(22) PCT Filed: Jul. 10, 2008

(86) PCT No.: PCT/JP2008/062454
§ 371 (c)(1),
(2), (4) Date: May 19, 2010

(87) PCT Pub. No.: WO2009/066485
PCT Pub. Date: May 28, 2009

(65) Prior Publication Data
US 2010/0263776 A1      Oct. 21, 2010

(30) Foreign Application Priority Data
Nov. 22, 2007   (JP) .................................. 2007-302401

(51) Int. Cl.
*B60C 11/117*   (2006.01)
*B60C 11/13*    (2006.01)
(52) U.S. Cl. .......... 152/209.17; 152/209.18; 152/209.21
(58) Field of Classification Search ............. 152/209.15, 152/209.17–209.19, 209.21–209.23, 209.25–209.27
See application file for complete search history.

(56) References Cited

U.S. PATENT DOCUMENTS

| | | | |
|---|---|---|---|
| 6,866,076 B2 * | 3/2005 | Ohsawa | ................... 152/209.21 |
| 2005/0126670 A1 | 6/2005 | Godefroid | |
| 2006/0042738 A1 * | 3/2006 | Matsumoto | .............. 152/209.21 |

FOREIGN PATENT DOCUMENTS

| | | | |
|---|---|---|---|
| JP | 03-86605 | | 4/1991 |
| JP | 10-315711 | | 12/1998 |
| JP | 2001-058509 A | * | 3/2001 |
| JP | 2005-104385 | | 4/2005 |
| JP | 2005-170381 | | 6/2005 |
| JP | 2006-69305 | | 3/2006 |

OTHER PUBLICATIONS

Machine Translation for JP-2011-05809-A (No Date).*

* cited by examiner

*Primary Examiner* — Steven D Maki
*Assistant Examiner* — Kendra Shin
(74) *Attorney, Agent, or Firm* — Fish & Richardson P.C.

(57) ABSTRACT

A pneumatic tire comprises main grooves 1 extending in the tire circumferential direction formed in a tread, wherein there are provided with a plurality of oblong holes 11 extending in the depth direction of the main groove 1 and communication grooves 12 extending diagonally with respect to the tread surface to communicate the oblong holes 11, a width w1 and a depth d1 of the oblong hole 11 are at least not less than 0.2 mm and 0.01 to 0.25 times a width W of the main groove 1, a height h of the oblong hole 11 is 50 to 80% of a depth D of the main groove 1, a space p1 between the oblong holes 11 is at least not less than 0.4 mm and 0.04 to 1.0 times the width W of the main groove 1, a width w2 and a depth d2 of the communication groove 12 are at least not less than 0.2 mm and 0.01 to 0.25 times the width W of the main groove 1, and two or more communication grooves 12 are present within the contact ground length L of the main groove 1.

1 Claim, 3 Drawing Sheets

PNEUMATIC TIRE WITH TREAD HAVING MAIN GROOVES, OBLONG HOLES, AND COMMUNICATION GROOVES

TECHNICAL FIELD

The present invention relates to a pneumatic tire with reduced air columnar resonance noise level and improved drainage performance.

This application claims benefit of priority based on Japanese Patent Application No. 2007-302401 filed on Nov. 22, 2007, the entire same contents of which are incorporated by reference herein.

BACKGROUND ART

In a state where a tire contacts the ground, tubular space is formed by a main groove extending in the tire circumferential direction and road surface. The rotation of tires lets air compressed in the tubular space to release outside, and as a result, air columnar resonance noise is generated. Since the air columnar resonance noise is offensive noise whose frequency is around 1 kHz, reduction in air columnar resonance noise has been demanded conventionally. For example, the pneumatic tire disclosed in Patent document 1 has a great number of oblong holes extending in the depth direction of a main groove formed in a sidewall of the main groove. By the oblong holes, friction resistance against the air flow in the main groove is increased, resulting in reduction in air columnar resonance noise.

Patent Document 1: Unexamined Japanese Laid-Open Patent Publication No. 10-315711(FIG. 1)

DISCLOSURE OF THE INVENTION

Problem to be Solved by the Invention

The pneumatic tire of Patent document 1 required to increase the depth and width of the oblong holes when intending to increase the friction resistance against the air flow in the main groove. However, at the same time, since the drainage performance was likely to be lowered, air columnar resonance noise could not be reduced sufficiently.

The object of the present invention is to provide a pneumatic tire with reduced air columnar resonance noise level and improved drainage performance.

Means for Solving the Problems

The pneumatic tire of the present invention has main grooves extending in the tire circumferential direction formed in a tread. The pneumatic tire is characterized in that there are provided with a plurality of oblong holes extending in the depth direction of the main groove and communication grooves extending diagonally with respect to the tread surface to communicate the oblong holes in both sidewalls of the main groove and in that a width w1 and a depth d1 of the oblong hole are at least not less than 0.2 mm and 0.01 to 0.25 times a width W of the main groove, a height h of the oblong hole in the depth direction of the main groove is 50 to 80% of a depth D of the main groove, a space p1 between the oblong holes is at least not less than 0.4 mm and 0.04 to 1.0 times the width W of the main groove, a width w2 and a depth d2 of the communication groove are at least not less than 0.2 mm and 0.01 to 0.25 times the width W of the main groove, and two or more communication grooves are present within the ground contact length L of the main groove.

As in the conventional tires, the friction resistance against the air flow in the main groove is increased by a plurality of the oblong holes extending in the depth direction of the main groove. Since each of the oblong holes is divided into different lengths by the communication grooves, the particle velocity of the air flow in the main groove becomes non-uniform, and therefore air columnar resonance noise is more reduced.

In addition, since the draining of water in the main groove is facilitated by communication grooves 12 when traveling on wet road, the drainage performance is improved. Furthermore, because the communication groove is shorter than the contact ground length L, the communication groove is closed within the contact ground length L, so that the friction resistance against the air flow is not decreased by the communication groove. Therefore, air columnar resonance noise can not be increased.

Figure 1:
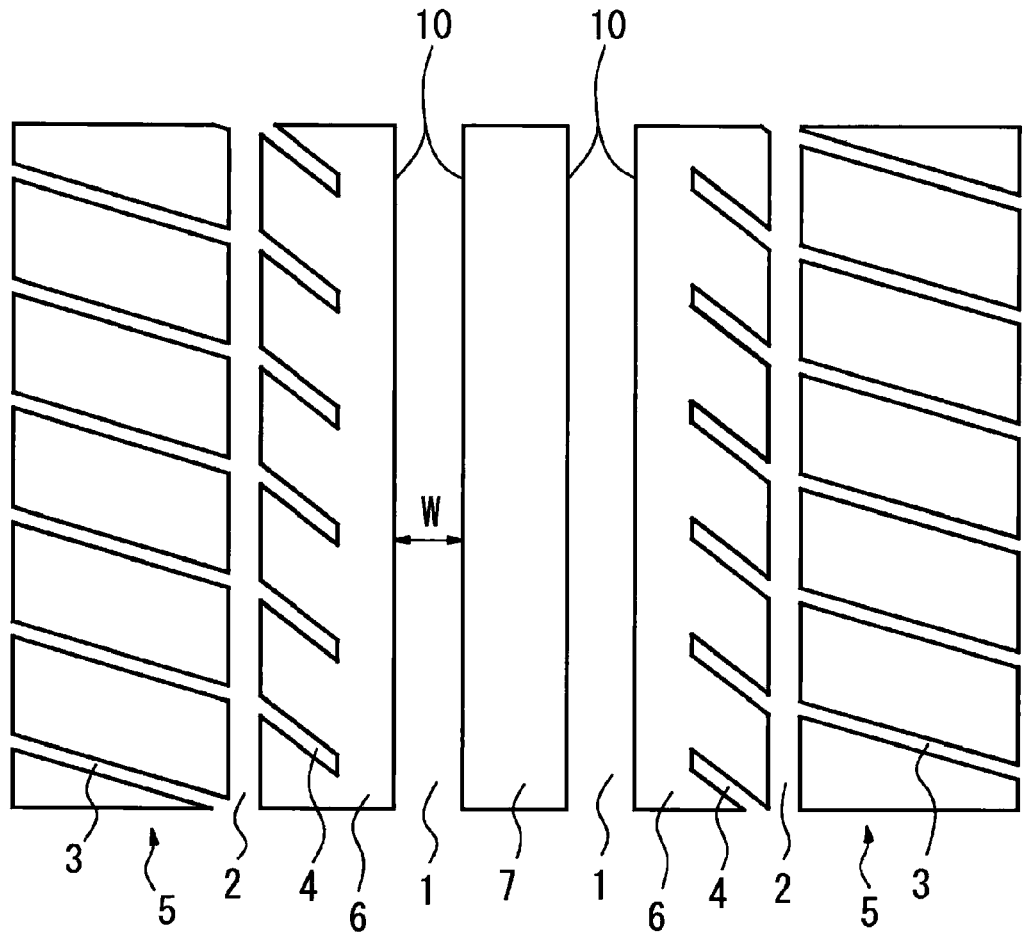
FIG. 1 is a view showing a tread pattern of the pneumatic tire related to the present invention.

DESCRIPTION OF THE REFERENCE NUMERALS 1,2 main grooves
3 transverse groove
4 lug groove
10 sidewall of main groove
11 oblong hole
12 communication groove

BEST MODE FOR CARRYING OUT THE INVENTION

Hereinafter, the embodiments for carrying out the pneumatic tire of the present invention are described with referent to drawings. FIG. 1 is a view showing a tread pattern of the pneumatic tire related to the present invention. Main grooves 1 and 2 extending in the tire circumferential direction are formed in a tread and transverse grooves 3 and lug grooves 4 are further formed thereon. Block rows 5 are formed at both ends in the tire width direction and ribs 6 having lug grooves are formed further inside, respectively. In the center of the width direction, a rib 7 is formed by the main grooves 1.

Figure 2:
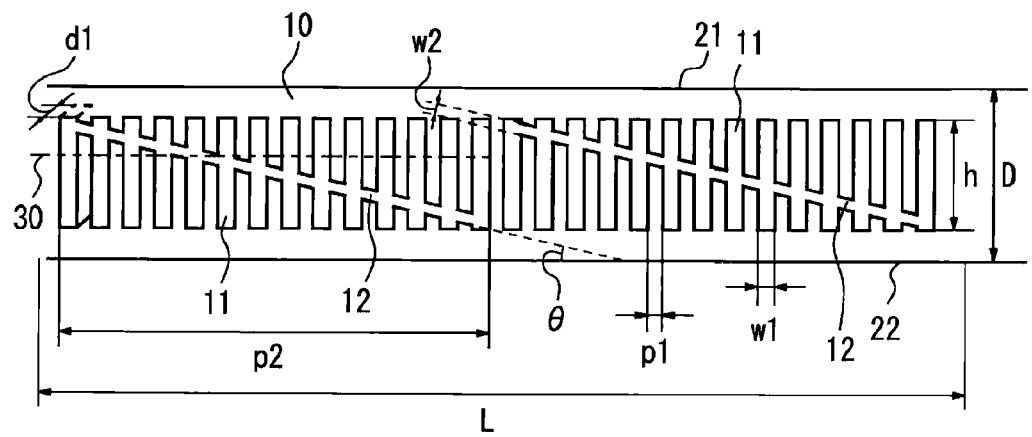
FIG. 2 is a view showing a sidewall of the main groove.

FIG. 2 shows a sidewall of the main groove 1 to which transverse grooves are not connected. In a sidewall 10, a plurality of oblong holes 11 are arranged at intervals in the tire circumferential direction. The oblong holes 11 extend in a direction toward a groove bottom 21 from a tread surface 22 (which is in a direction perpendicular to the tread surface, in the depth direction of the main groove).

Furthermore, communication grooves 12 which communicate the oblong holes 11 are formed thereon. The communication grooves 12 extend not parallel to the tread surface, but diagonally with respect to the tread surface. One end of the communication groove 12 terminates at an end part of one oblong hole 11 on the side of the tread surface 22 and another end of the communication groove 12 terminates at an end part of another oblong hole 11 on the side of the groove bottom 21. It is noted that the oblong holes 11 and the communication grooves 12 are also formed in the opposed sidewall of the main groove 1 (not illustrated).

The friction resistance against the air flow in the main groove 1 is increased by the oblong holes 11, so that air columnar resonance noise can be reduced. Since the oblong holes 11 are not opened to the tread surface 22, but closed within the sidewall 10, air columnar resonance noise can be reduced effectively. Furthermore, since each of the oblong holes 11 is divided into different lengths by the communication grooves 12 extending diagonally with respect to the tread surface, the particle velocity of the air flow in the main groove 1 becomes non-uniform, thereby more reducing air columnar resonance noise.

On the other hand, in the case of traveling on wet road, for example, when tires are immersed in water up to a dot-and-dash line 30 as shown in FIG. 2, the draining of water in the main groove 1 is facilitated by the part of the communication grooves 12 on the side of the groove bottom 21 from the dot-and-dash line 30, and therefore the drainage performance can be improved. Because the communication groove 12 is shorter than the contact ground length L, the communication groove 12 is closed within the contact ground length L and thus does not cause reduction in the friction resistance against the air flow. Therefore, air columnar resonance noise can not be increased.

It is preferred that a width w1 and a depth d1 of the oblong hole 11 are at least not less than 0.2 mm and 0.01 to 0.25 times a width W of the main groove 1 and a height h of the oblong hole 11 is 50 to 80% of a depth D of the main groove 1. In addition, it is preferred that a space p1 between the oblong holes 11 is at least not less than 0.4 mm and 0.04 to 1.0 times the width W of the main groove 1. When the width w1 or depth d1 of the oblong hole 11 is small out of these ranges, the height h is low or the space p1 is wide out of these ranges, the effect of reducing air columnar resonance noise becomes small. On the other hand, when the width w1 or the depth d1 of the oblong hole 11 is large, the height h is high or the space p1 is narrow, the rigidity of the ribs 6 and 7 on both sides of the main groove 1 is excessively lowered, which may deteriorate steering stability or generate uneven wear.

It is preferred that that a width w2 and a depth d2 of the communication groove 12 are at least not less than 0.2 mm and 0.01 to 0.25 times the width W of the main groove 1. When the width w2 or depth d2 of the communication groove 12 is small out of these ranges, the effect of facilitating water drainage becomes small. On the other hand, when the width w2 or the depth d2 of the communication groove 12 is large, the rigidity of the ribs 6 and 7 on both sides of the main groove 1 is too lowered, which may deteriorate steering stability or generate uneven wear.

It is preferred that an angle θ made by the communication groove 12 with respect to the tread surface 22 is set to be from 15 to 30 degrees. When the angle θ is less than 15 degree, the length of the communication groove 12 becomes longer, thereby taking longer time to drain water. As a result, the effect of facilitating water drainage becomes small. On the other hand, when the angle θ exceeds 30 degrees, the effect of draining water in a vehicle traveling direction is deteriorated.

Figure 3:
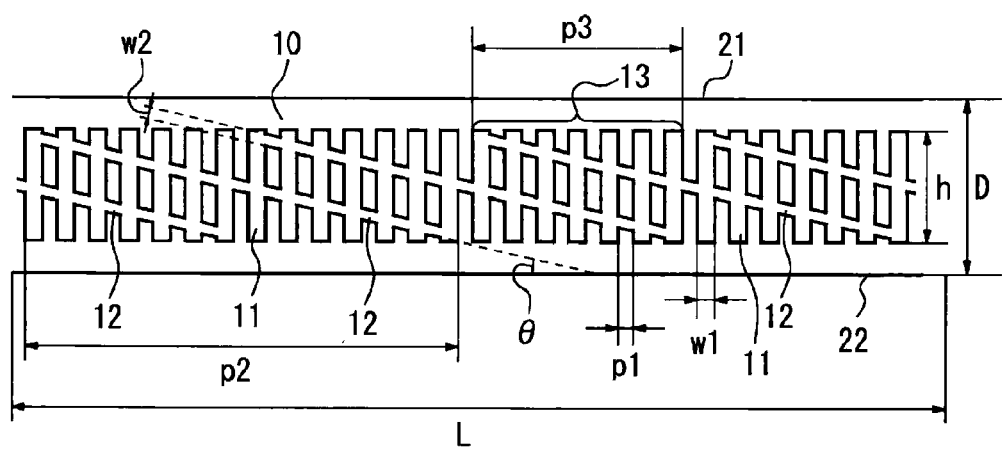
FIG. 3 is a view showing a sidewall of the main groove.

From a viewpoint of improving drainage performance, it is preferred that a length p2 of the communication groove 12 in the circumferential direction is set so that two or more communication grooves 12 which are contained completely within the contact ground length L of the main groove 1 are present. Therefore, as shown in FIG. 3, for example, the communication grooves 12 may be arranged in order to provide a part 13 where the communication grooves 12 overlap with each other. However, when the number of the communication grooves 12 is increased, the rigidity of the ribs 6 and 7 on both sides of the main groove 1 is excessively lowered, which may result in the deterioration of steering stability or generation of uneven wear. Therefore, a length p3 of the part 13 where the communication grooves 12 overlap with each other is preferably set within ½ of the length p2 of the communication groove 12 in the circumferential direction. Here, the contact ground length L of the main groove 1 represents the length of a part where the main groove 1 contacts with ground under the normal inner pressure (that is the maximum air pressure according to JATMA) and the normal load (that is the maximum load ability according to JATMA) when a tire is mounted on the normal rim (that is a standard rim according to JATMA).

Figure 4:
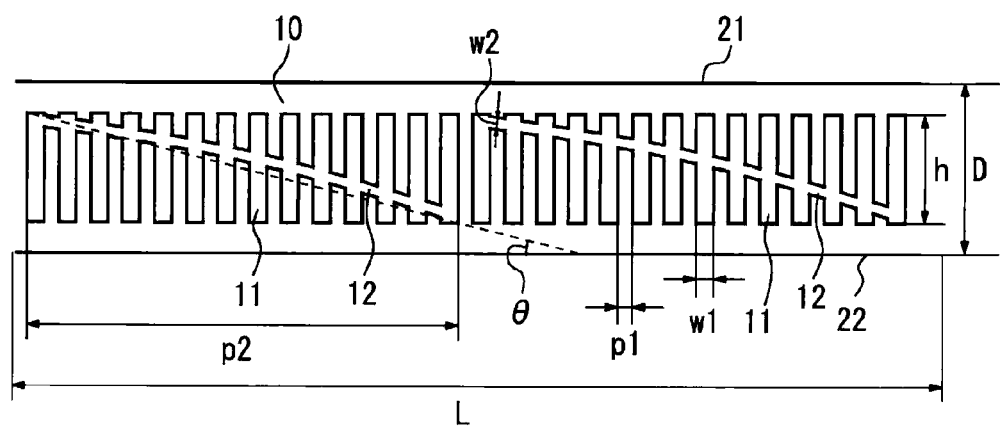
FIG. 4 is a view showing a sidewall of the main groove.
Figure 5:
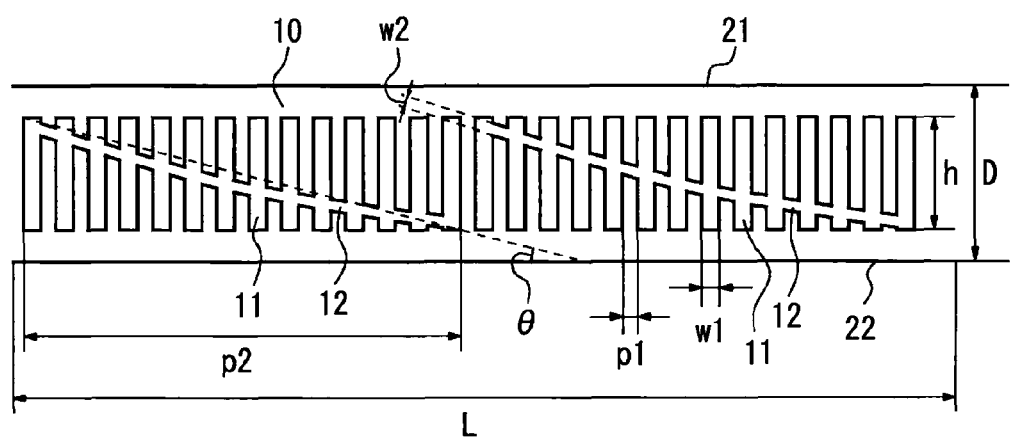
FIG. 5 is a view showing a sidewall of the main groove.

As shown in FIGS. 4 and 5, the communication groove 12 may be curved so as to be projected toward the side of the groove bottom 21 (FIG. 4) and it may be curved so as to be projected toward the side of the tread surface 22 (FIG. 5). Even in the case where the communication groove 12 is curved, the communication groove 12 can be arranged to provide overlapped portions as shown in FIG. 3. In this case, the angle θ made by the communication groove 12 with respect to the tread surface 22 is defined as the angle made by a straight line passing through both ends of the communication groove 12 and the tread surface 22.

In a tire in which the rotation direction is specified, the communication groove 12 is preferably arranged in any sidewalls to extend from the side of the groove bottom 21 to the side of the tread surface 22 as it extends more in the rotation direction. For example, in FIG. 2, as the communication groove 12 extends more in the rotation direction (rightward, in which a vehicle traveling direction is leftward), the communication groove 12 extends from the side of the groove bottom 21 to the side of the tread surface 22 (diagonally right down). In the opposed sidewall, the rotation direction is leftward and as the communication groove 12 extends more in the rotation direction (leftward), the communication groove 12 extends from the side of the groove bottom 21 to the side of the tread surface 22 (diagonally left down). Since water is drained in a vehicle traveling direction by providing the communication groove 12 in such a way, the ground contact property of the rear tires is improved.

Furthermore, in a tire in which the rotation direction is not specified, the communication groove 12 is preferably arranged so that the inclined direction of the communication groove 12 in one sidewall and the inclined direction thereof in the other sidewall are reversed with each other. For example, as shown in FIG. 2, in any sidewalls of the main groove 1, as the communication groove 12 extends more rightward, the communication groove 12 extends from the side of the groove bottom 21 to the side of the tread surface 22 (diagonally right down) or extends in the opposite direction. By providing the communication grooves 12 in such a way, advantageous effect for water drainage can be obtained in one of the sidewalls 10.

Example

Tires of Examples and Comparative Examples according to the present invention were manufactured and evaluated, respectively. Evaluation was made on the tire which has a tread pattern as shown in FIG. 1 and a tire size of 225/45R17 and which is mounted to the rim having a rim size of 17×7.5JJ under air pressure of 220 kPa. The tires of Examples and Comparative Examples except Comparative Example 1 were provided with oblong holes and communication grooves, which had the size and shape as shown in Table 1. The tire of Comparative Example 1 was not provided with communication grooves. The tire of Comparative Example 2 was the tire in which two communication grooves are not present within the contact ground length of the main groove and the tire of Comparative Example 3 was the tire in which communication grooves extend parallel to the tread surface through the center of oblong holes.

Evaluation results are as shown in Table 1. The drainage performance shows inverse of the velocity in which hydroplaning occurs while a passenger car of 2500 cc displacement mounted with tires was accelerated gradually on the wet road having a water depth of 4 mm, which are represented by indices with Comparative Example 1 set as 100. Therefore, as the number is larger, it shows good drainage performance.

The noise level is obtained by measurement on air columnar resonance noise level at ⅓ octave-band 1 kHz by a bench test according to JASO-C606 (at a velocity of 50 km/h). The measured values are given by decibel value based on Comparative Example 1.

TABLE 1

Figure 6:
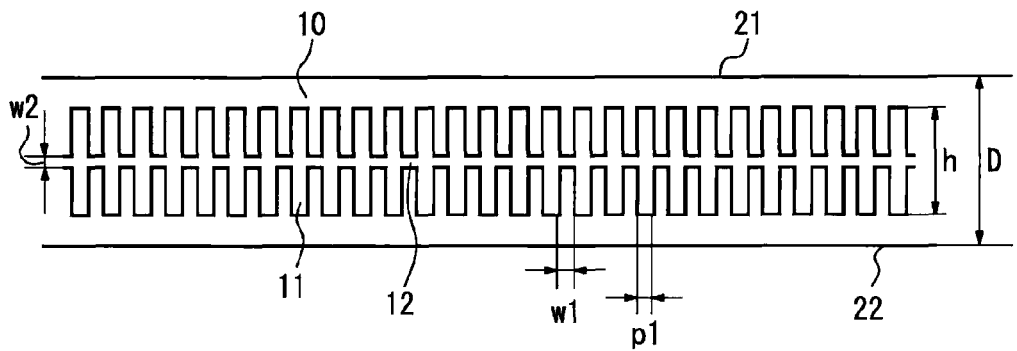
FIG. 6 is a view showing a sidewall of the main groove related to Comparative Example 3.

|  |  | Example 1 | Example 2 | Example 3 | Example 4 | Example 5 | Comparative Example 1 | Comparative Example 2 | Comparative Example 3 |
|---|---|---|---|---|---|---|---|---|---|
| Size of oblong hole (mm) | Width w1 | 1.0 | 1.0 | 1.0 | 0.2 | 2.5 | 1.0 | 1.0 | 1.0 |
|  | Depth d1 | 0.5 | 0.5 | 0.5 | 0.2 | 2.5 | 0.5 | 0.5 | 0.5 |
|  | Space p1 | 2.0 | 2.0 | 2.0 | 10.0 | 0.4 | 2.0 | 2.0 | 2.0 |
|  | Height h | 5.5 | 5.5 | 5.5 | 5.5 | 5.5 | 5.5 | 5.5 | 5.5 |
| Size of communication groove (mm) | Width w2 | 1.0 | 1.0 | 1.0 | 0.2 | 2.5 | — | 1.0 | 1.0 |
|  | Depth d2 | 0.5 | 0.5 | 0.5 | 0.2 | 2.5 | — | 0.5 | 0.5 |
|  | Circumferential length p2 | 20.5 | 20.5 | 20.5 | 20.5 | 20.5 | — | 62.9 | — |
|  | Length of overlapped portion p3 | 0 | 10.25 | 0 | 0 | 0 | — | 0 | 0 |
|  | Shape | FIG. 2 | FIG. 3 | FIG. 4 | FIG. 2 | FIG. 2 | — | FIG. 2 | FIG. 6 |
| Number of communication grooves contained completely within contact ground length L |  | 4 | 7 | 4 | 4 | 4 | — | 1 | 1 |
| Angle θ (degree) made by communication groove and tread surface |  | 15 | 15 | 15 | 15 | 15 | — | 5 | 0 |
| Drainage performance |  | 105 | 106 | 105 | 103 | 106 | 100 | 101 | 101 |
| Noise level (dB) |  | −1.0 | −1.3 | −1.0 | −0.8 | −1.3 | — | −0.5 | 0 |

Depth of main groove D: 8.0 mm
Width of main groove W: 10.0 mm
Contact ground length L of main groove: 100.0 mm According to Table 1, any tires of Examples have reduced air columnar resonance noise level and improved drainage performance. On the other hand, since in the tire of Comparative Example 2, the communication grooves 12 are longer than those of Examples and number of the communication grooves 12 are less than two within the contact ground length and in the tire of Comparative Example 3, the communication grooves 12 extend parallel to the tread surface, the drainage performance is not improved so much as expected. Moreover, the oblong holes 11 are equally divided by the communication grooves 12 in the tire of Comparative Example 3, and therefore, air columnar resonance noise level is not reduced.

What is claimed is:

1. A pneumatic tire with main grooves extending in the tire circumferential direction formed in a tread, wherein at least one main groove is provided with a plurality of oblong holes which begin at a distance above the main groove bottom, none of which oblong holes abut or are open at the ground surface of the tread, and which extend lengthwise in a tire radial direction of the main groove in both sidewalls of the main groove and further wherein there are provided communication grooves in both sidewalls, none of which communication grooves abut or are open at the ground surface of the tread, and which extend diagonally with respect to the tread surface to communicate with the oblong holes, a width w1 and a depth d1 of the oblong holes are at least not less than 0.2 mm and 0.01 to 0.25 times a width W of the main groove, a height h of the oblong holes in the depth direction of the main groove is 50 to 80% of a depth D of the main groove, a space p1 between adjacent oblong holes is at least not less than 0.4 mm and 0.04 to 1.0 times the width W of the main groove, a width w2 and a depth d2 of the communication grooves are at least not less than 0.2 mm and 0.01 to 0.25 times the width W of the main groove, and two or more communication grooves are present within the contact ground length L of the main groove.

* * * * *